Patented June 2, 1942

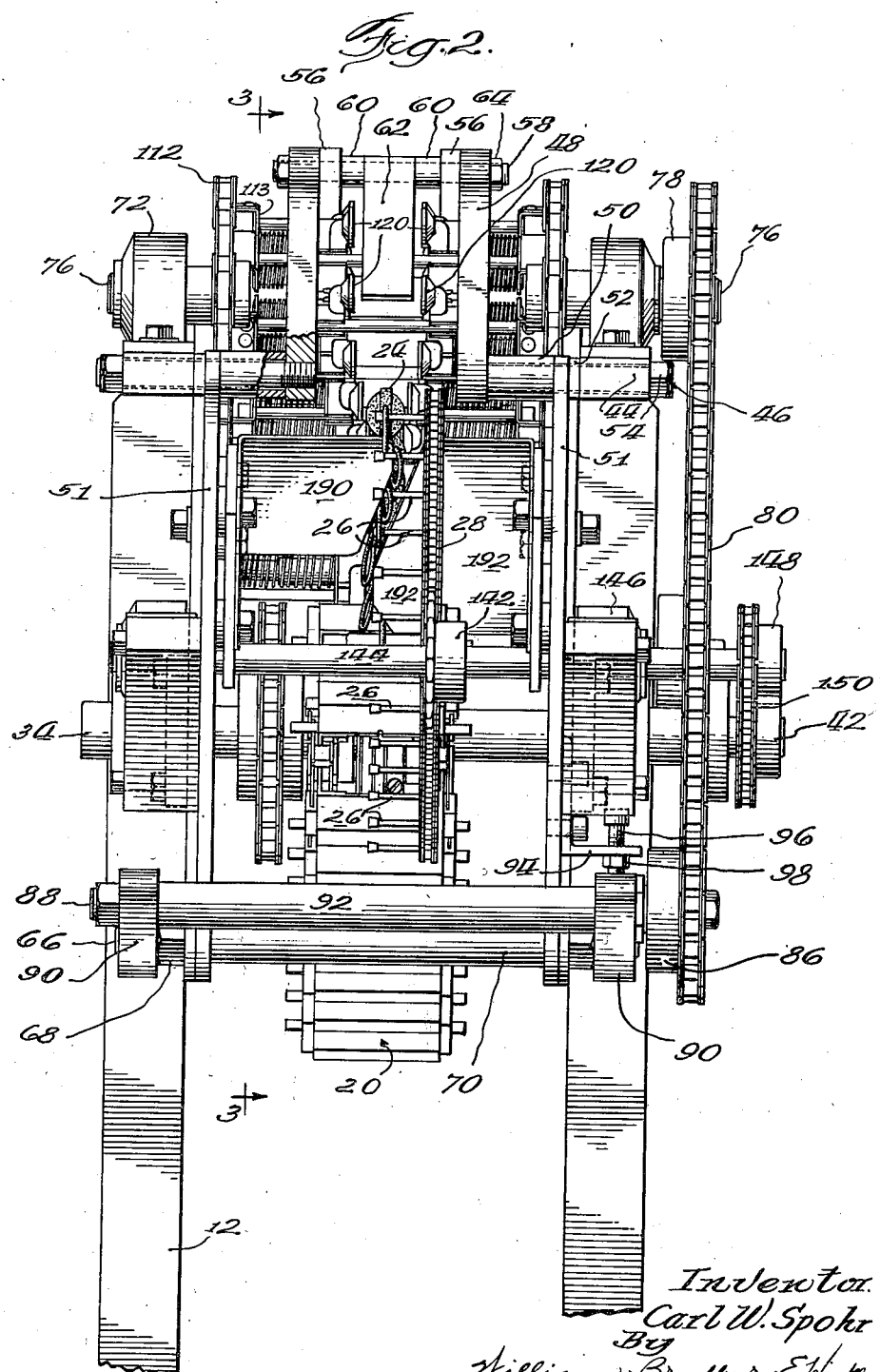

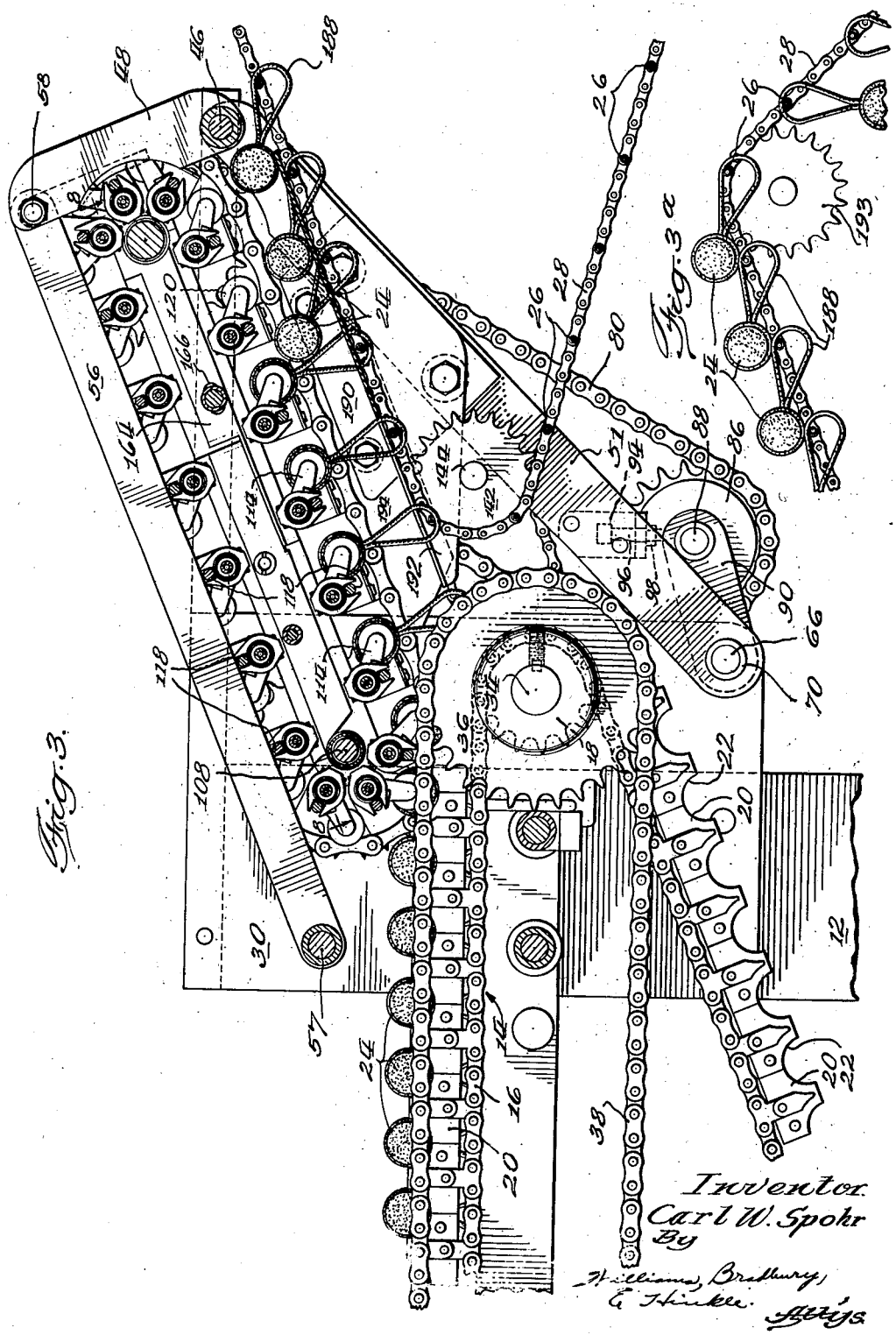

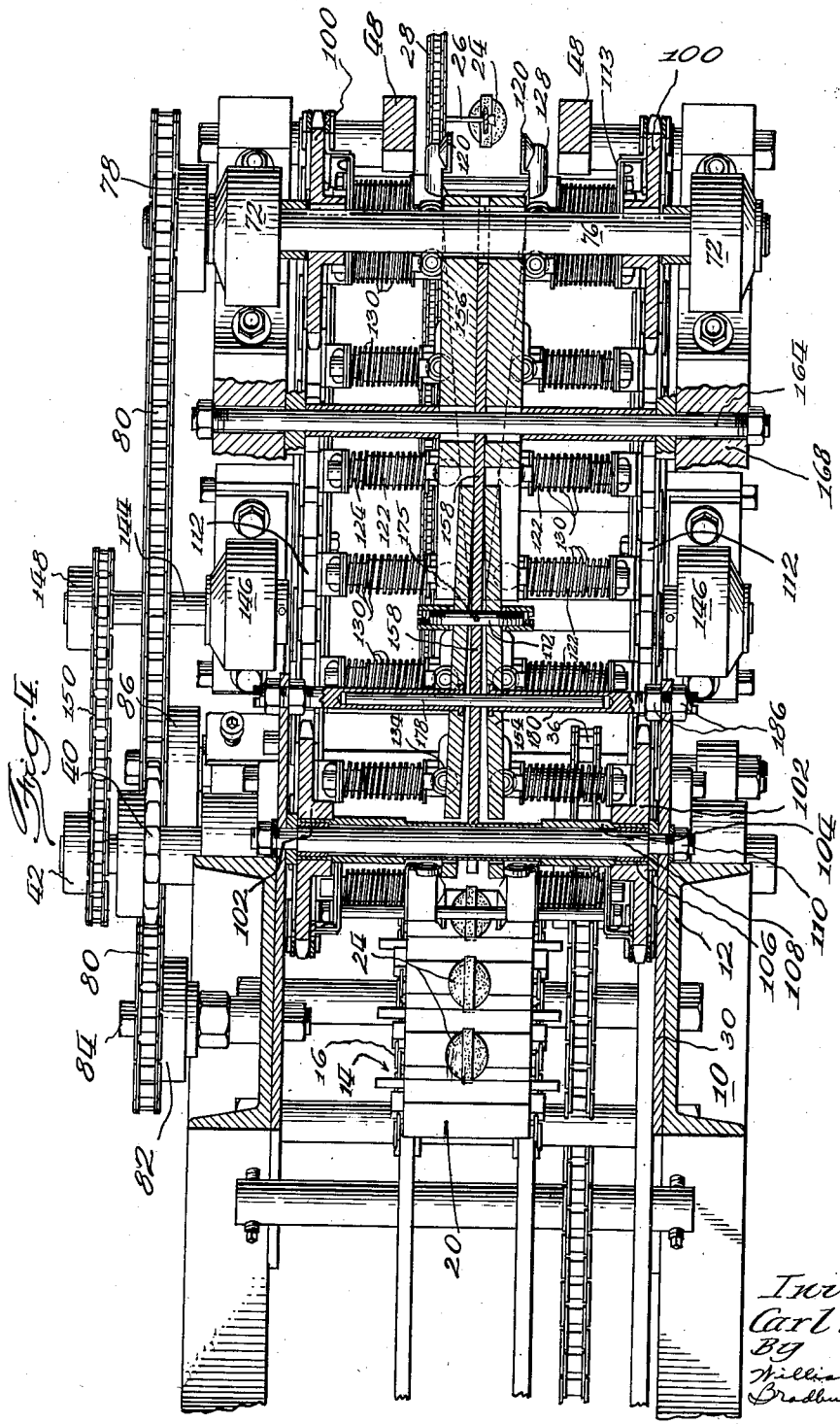

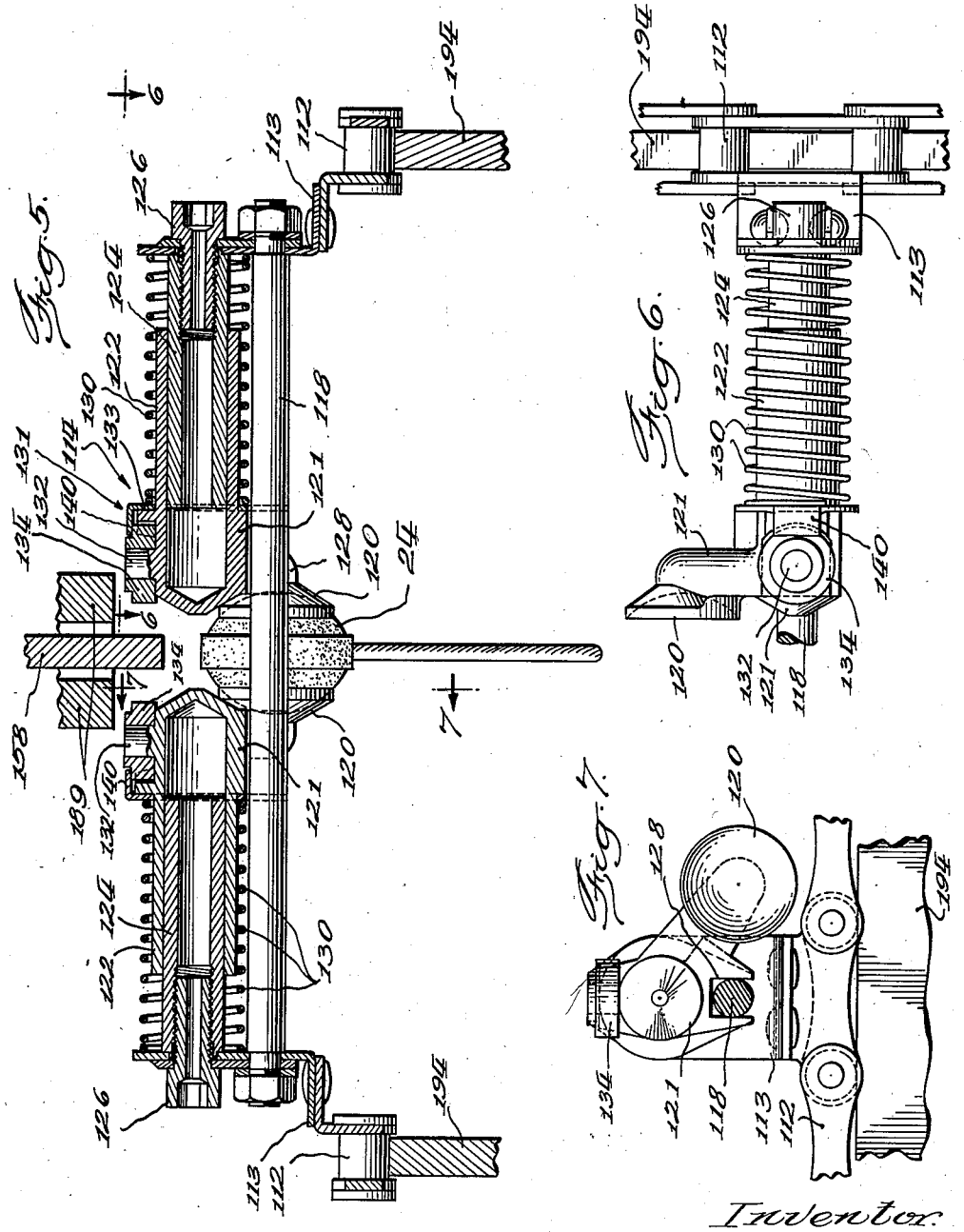

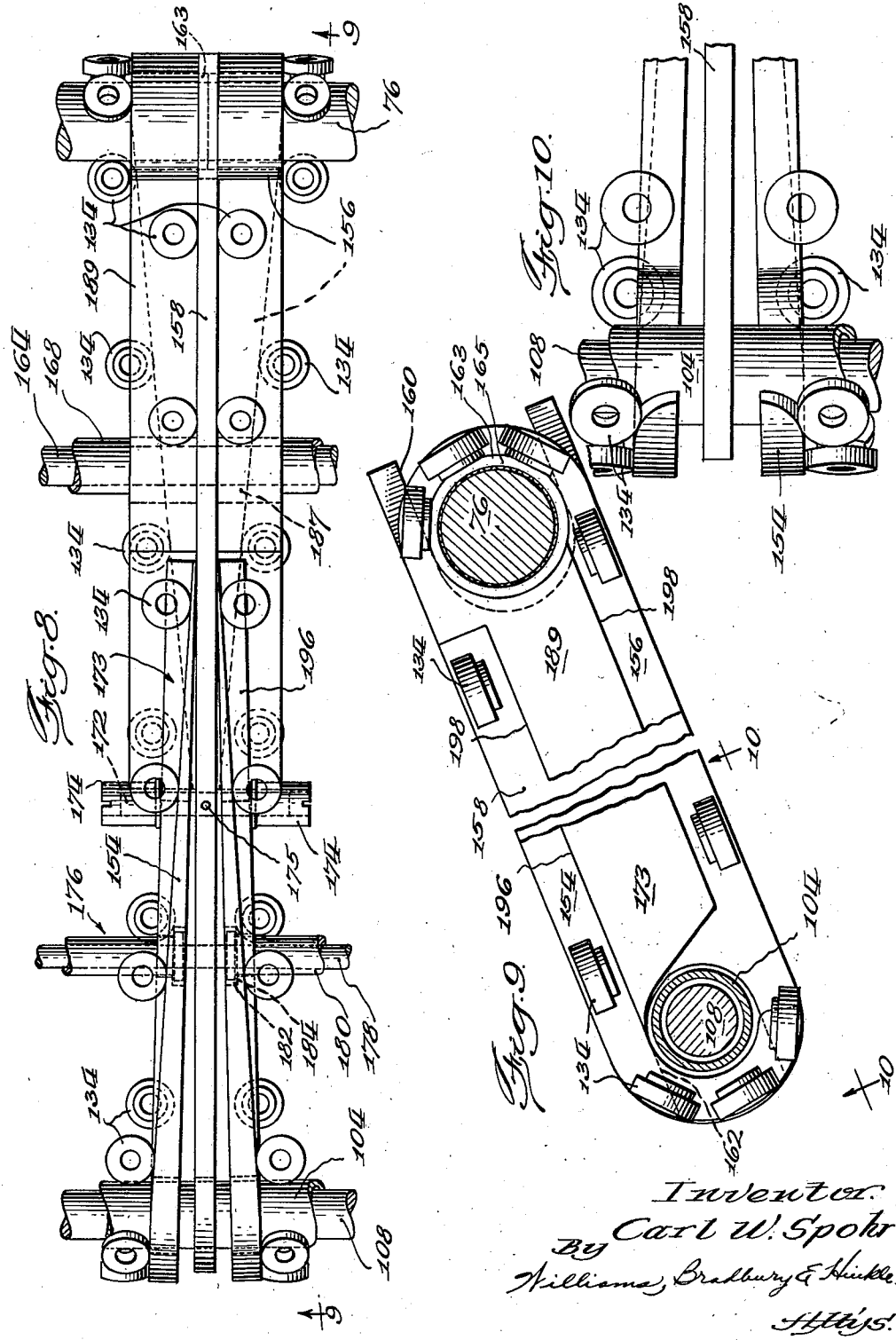

2,284,928

UNITED STATES PATENT OFFICE 2,284,928

CONFECTION HANDLING MECHANISM

Carl W. Spohr, Chicago, Ill., assignor to Saf-T-Pop Corporation, Dubuque, Iowa, a corporation of Delaware Application January 25, 1941, Serial No. 375,953

8 Claims. (Cl. 198—20)

This invention relates to devices for handling confections. More particularly the device of the present invention comprises a mechanism for removing lollipops from a lollipop making machine and transferring these lollipops to a conveyor. The machine for manufacturing lollipops and the conveyor, which may be used for carrying the finished lollipops through a cooling tunnel or to some other place in the building, form no part of the present invention, since the present invention is limited to a device for taking the lollipops from their molds and attaching these lollipops in turn to the conveyor.

Although the device illustrative of the present invention can be adapted for different specific uses, it is shown in connection with a lollipop manufacturing machine which forms the subject matter of a copending patent application filed in the names of Carl W. Spohr and Robert F. Bracke, the latter application having been filed on December 23, 1940, and bearing Serial No. 371,336.

The device of the copending application referred to forms lollipops having a generally spherical, edible head attached to a handle formed of a loop of twisted paper cord; and whereas in the copending application these lollipops are shown as being ejected from the rearward end of the machine upon a belt conveyor or the like, it is the purpose of the present invention to grasp these lollipops and lift them from the molds at the moment they are ejected therefrom, and to transfer these lollipops to a conveyor which it is intended will convey the lollipops through a cooling tunnel and thence to a place where they are packed for shipment.

It is an object of the present invention to provide a novel mechanism for picking up lollipops by their heads and lifting these lollipops from a lollipop forming machine in a manner such that the heads are not deformed.

Another object is to provide a novel machine for lifting lollipops from their molds and hooking the handles of the lollipops over pins forming a portion of a conveyor.

It is an additional object of my invention to provide a novel mechanism for accomplishing the above and which removes the lollipops from the lollipop forming molds in such a manner that the lollipop molds do not damage the edges of the lollipops.

Yet another object of the present invention is to provide a novel transferring mechanism that transfers lollipops from their forming molds to a conveyor mechanism in a comparatively short space of time, so that the lollipops will not be held by the transferring mechanism sufficiently long to cause noticeable deformation of their heads.

A more specific object of the present invention is to provide a novel transferring mechanism, having the above features, and which automatically keeps it moving elements free of sticky sugar deposit that might otherwise jam these elements and cause them to fail to function properly.

Other objects and advantages will become apparent from the following description of a preferred embodiment of my invention taken in conjunction with the accompanying drawings, in which:

Fig. 2 is a rear end elevation of the device shown in Fig. 1;

Fig. 3 is a longitudinal vertical sectional view of the mechanism taken in the direction of the arrows substantially along the line 3—3 of Fig. 2;

Fig. 3a is a side view of a portion of the lollipop conveyor as it appears at a position somewhat to the left of Fig. 3;

Fig. 4 is an oblique sectional view taken in the direction of the arrows substantially along the line 4—4 of Fig. 1;

Fig. 5 is a detailed view showing a portion of the device in transverse vertical section. This view may be considered as having been taken in the direction of the arrows substantially along the line 5—5 of Fig. 1;

Fig. 6 is a plan view of a portion of the mechanism shown in Fig. 5 and may be considered as taken along the line 6—6 of Fig. 5 looking downwardly, as indicated by the arrows;

Fig. 7 is a detailed vertical sectional view of the portion of the mechanism shown in Figs. 5 and 6, and may be considered as having been taken in the direction of the arrows substantially along the line 7—7 of Fig. 5;

Fig. 8 is an oblique view looking generally downwardly and backwardly at the control cam and roller mechanism of the device, and in general is taken in the direction of the arrows along the line 8—8 of Fig. 3, with a portion of the mechanism that would normally show in such a section eliminated from the view in the interest of clarity;

Figure 1:
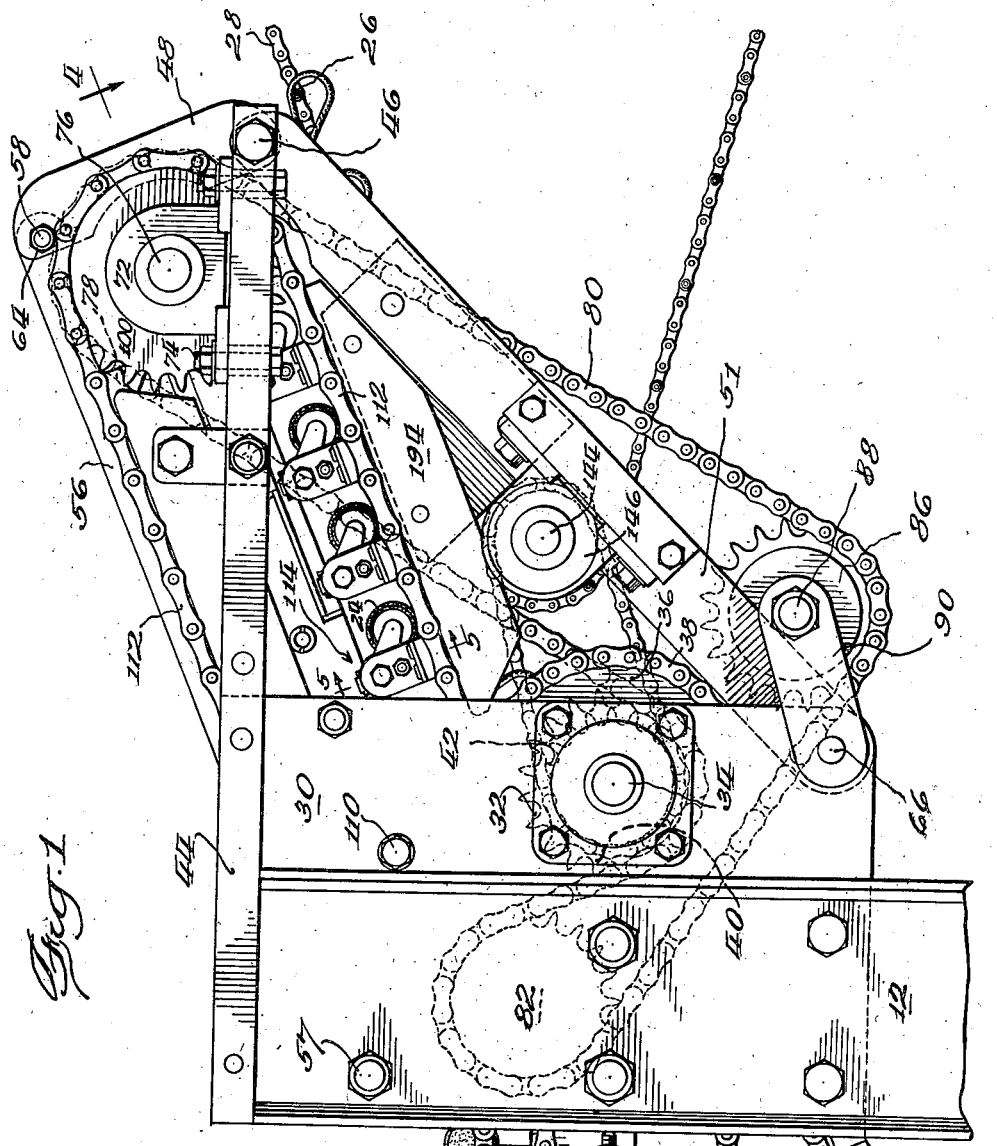
Fig. 1 is a side elevation of a device embodying the present invention, shown positioned between the rearward end of a lollipop manufacturing machine and the forward end of a lollipop conveyor.
Figure 1:
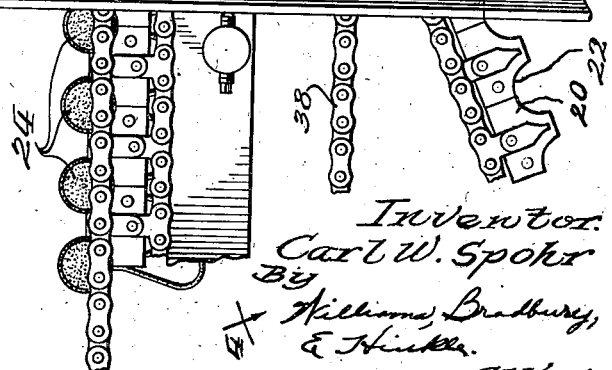

Fig. 9 is a vertical longitudinal sectional view which may be considered as taken in the direction of the arrows along the line 9—9 of Fig. 8. This view shows on a larger scale the cam and roller mechanism in side elevation; and Fig. 10 is a fractional view of a portion of the cam and roller mechanism as seen when looking obliquely upwardly and rearwardly. This view may be considered as having been taken in the direction of the arrows along the line 10—10 of Fig. 9.

The rearward end of the lollipop manufacturing machine forming the subject matter of the before-mentioned copending application is comprised generally of a frame 10 having rearward upstanding frame members 12 which carry the rearward bight of a mold chain 14. In general, this mold chain, which extends from end to end of the candy making machine, is comprised of a roller chain 16 which passes over rearward sprockets 18 and carries mold elements 20. These mold elements provide individual cavities 22 which convey the completely formed lollipops 24 to the rearward end of the machine.

As the mold chain passes around the rearward sprockets 18, the mold elements are separated and thus permit the lollipops to be ejected or pulled from the molds, since the separation of the mold elements provides a space therebetween through which the lollipop handles can be pulled.

The present device, which is secured to the rearward vertical members 12 of the lollipop manufacturing machine, picks up the lollipops 24 by their heads at the moment the mold elements are separated and quickly swings the lollipops away from the mold elements and conveys these lollipops generally upwardly and rearwardly to a position where the handle loops are slipped over the ends of generally horizontally, outwardy extending pins 26 secured to a conveyor chain 28.

The mechanism of the present device includes a pair of rectangular side plates 30 secured to the inner faces of the upstanding members 12 of the lollipop forming machine and which project rearwardly somewhat behind these members. Bearing boxes 32 secured to these plates contain anti-friction bearings which journal a cross shaft 34 which, in turn, carries the rearward mold chain sprockets 18. This shaft 34 also carries another sprocket 36 which is driven by a roller chain 38 driven in turn from a drive sprocket not shown, but located farther forward of the lollipop forming machine.

Two other sprockets 40 and 42 are secured to the shaft 34. Of these two, the sprocket 40 serves to drive the grasping and transferring elements, while the sprocket 42 drives the lollipop conveyor chain 28.

At their upper ends, the plates 30 carry a pair of rearwardly and horizontally extending bars 44 which at their rearward ends are provided with horizontally extending transverse holes through which cap screws 46 are passed. Each of these cap screws 46 is threaded at its inward end into a plate 48 and projects outwardly from the plate successively through a tubular spacing element 50, a downwardly and forwardly inclined bracing member 51, a spacing washer 52 and one of the bars 44. Heads 54 at the outward ends of the cap screws 46 serve to clamp the above-mentioned members together.

The plates 48 extend generally upwardly and somewhat forwardly from the cap screws 46 and at their upper ends are secured to forwardly and downwardly extending bars 56, which are in turn connected at their forward ends to the side plates 30 by means of a long transversely extending bolt 57. The two upstanding plates 48 are secured to the downwardly and forwardly inclined bars 56 by means of a stud 58 which extends in turn through aligned openings in one of the plates 48, one of the bars 56, a tubular spacing member 60, a centrally disposed knockout element 62, to be described more fully subsequently, a second tubular spacing element 60, the second bar 56, and finally the other upstanding plate 48. Each end of the stud 58 is provided with nuts 64 threaded thereto by means of which the elements above-mentioned are tightly clamped together. At their lower ends the downwardly inclined bracing members 51 are secured to the rearward lower corners of the plates 30 by a long stud 66 passed through the plates 30 and the bracing members 51. Nuts 68 at each end of the stud 66 clamp the several elements together. The central portion of the stud 66 passes through a tubular spacing element 70 which serves to oppose inward movement of the bracing elements 51 when the nuts 68 are tightened.

The above-described elements may be considered as comprising the frame to which the other elements of the transferring device are secured. A pair of aligned pillow blocks 72 are secured by bolts 74 against the upper surfaces of the rearward portions of the horizontally extending bars 44. These pillow blocks journal a cross shaft 76 provided at one end with a drive sprocket 78. This sprocket is driven by a roller chain 80 the upper bight of which passes forwardly and downwardly from around this sprocket, around the sprocket 40 rotatable with the shaft 34, thence upwardly and forwardly and around an idler sprocket 82. The idler sprocket 82 is mounted to rotate upon a stub shaft 84 bolted through the flange of the upright 12 and the contiguous plate 30. This idler serves merely to insure good engagement between the chain 80 and the sprocket 40. After passing around the idler sprocket 82 the chain extends rearwardly and downwardly and around an adjustable take-up idler sprocket 86. After passing around the idler 86 the chain extends upwardly and somewhat rearwardly and around the sprocket 78 to the point of beginning.

The idler sprocket 86 is journaled to rotate at the end of a rod 88 which extends transversely across the machine and is secured intermediate its ends to the rearward ends of a pair of arms 90. The forward ends of the arms 90 are pivoted to the ends of the stud 66 which clamps the bracing members 51 to the plates 30. Between the arms 90 the rod 88 passes through a tubular spacing member 92 which serves to space the arms 90 apart and aids in giving rigidity to this idler mounting. A bracket 94 is secured to one of the bracing members 51 in a position over the outer end of the arm 90 that is contiguous to the sprocket 86. An adjustment screw 96 is threaded through the bracket member 94 and bears with its end against the upper surface of the arm 90, so that by adjusting the screw 96 upwardly or downwardly, the arm 90, together with the sprocket 86, can be raised or lowered to tighten or loosen the chain 80. When properly adjusted, a lock nut 98 threaded upon the screw 96, is tightened against the bracket 94 to prevent further rotation of the adjustment screw.

Between the pillow blocks 72, the shaft 76 is keyed to a pair of conveyor drive sprockets 100 while downwardly and forwardly of this position a pair of similar sprockets 102 are mounted upon a quill shaft 104 journaled to rotate on anti-friction bearings 106. These anti-friction bearings in turn are supported by a rod 108 which extends transversely of the machine and is secured at its ends to the plates 30 by means of nuts 110.

A pair of conveyor chains 112 are looped between the aligned sprockets 100 and 102 and at intervals are connected to the lower ends of inwardly and upwardly extending Z-shaped brackets 113. The upper ends of each pair of these Z-shaped brackets are joined by transversely extending rods 118 which serve as bracing members and also as guides for inwardly and outwardly movable candy gripping members 114. These members 114 are comprised of cups 120 which move inwardly and outwardly and are adapted to grip a ball-shaped lollipop head 24 therebetween. These cups are formed as integral portions of castings 121 also having outwardly extending tubular portions 122 which telescope over sleeves 124, the latter in turn being secured to the upper ends of the Z-shaped brackets 113 in a position above the bar 118 by means of screws 126. Adjacent the tubular portion 122, each of the castings 121 is provided with a slot 128 which fits the rod 118, so that the cups 120 are free to move inwardly and outwardly over the sleeves 124 but are prevented from rotating relative thereto. These gripping members are urged inwardly by coil springs 130 which surround the tubular portions 122 and bear with their inner ends against clips 131 which in turn bear against shoulders 133 formed upon the gripping members 114 at the inner ends of the tubular portions 122. At their outer ends these springs bear against the inner faces of the brackets 113. These springs, therefore, tend to urge the gripping members 114 inwardly toward each other into lollipop gripping position.

On the side of the gripping member 114 opposite the slot 128 the casting is formed to provide an outwardly extending pin 132 which journals a cam following roller 134. The clips 131, held in place against the shoulders 133 by springs 130, have an upstanding portion 140 bent over at right angles into a position above the outer face of the rollers 134. They, therefore, prevent the rollers from sliding off the pins 132.

It will be seen that the above mechanism provides an arrangement such that the gripping members 114 are conveyed continuously from a position rearwardly of and above the lollipop molds in a downwardly and forwardly direction. Toward the forward portion of the transferring mechanism, these gripping members pass around the sprockets 102 into a position such that the cups 120 are in axial alignment with the head 24 of a lollipop resting in one set of the lollipop molds. The speeds of the mold conveyor and the conveyor for the gripping members are so correlated relative to the spacing between contiguous lollipop molds 20 and the spacing between contiguous gripping members that succeeding gripping members will for a moment be in axial alignment with succeeding lollipops. From this position the lollipop gripping members move in an upwardly and rearwardly direction to the rearward sprockets 100.

Slightly to one side of the center of the transferring mechanism, a sprocket 142 is mounted to rotate with a transverse shaft 144 journaled in pillow blocks 146 secured to the downwardly and forwardly extending side members 51. One end of the shaft 144 is provided with a second sprocket 148 connected by a chain 150 to the drive sprocket 42 secured in alignment thereto upon the outer end of the shaft 34. The sprocket 142 drives the conveyor chain 28 which extends from the upper side of the sprocket 142 in an upwardly and rearwardly direction and is generally parallel to the direction of movement of the gripping members 114.

At intervals the conveyor chain 28 carries outwardly extending headed pins 26. The spacing between these pins is the same as the spacing between the gripping members 114, and the velocity of movement of the conveyor chain 28 is also the same as the velocity of the gripping members. With this arrangement the gripping members, while moving in an upwardly and rearwardly direction, move in a path parallel to the direction of movement of the pins 26, while the spacing between any particular pin 26 and the contiguous gripping member is somewhat less than the distance from the center of the lollipop head held in the gripping member to the end of its handle.

As has been previously pointed out, the cups 120 are normally urged toward each other by the springs 130. As the gripping members move in a forwardly and downwardly direction, the cam following rollers 134 are urged apart by a wedge-shaped cam 154 until, when the gripping members have reached the position where they are rounding the forward sprocket 102, the cups 120 have been urged apart sufficiently so that the distance between these cups is greater than the thickness of the head 24 of a lollipop.

As these gripping members pass around the forward sprockets 102 and the cups thereon are brought into axial alignment with a lollipop head, the rollers 134 run off the end of the cam 154, thus permitting the springs 130 to urge the cups inwardly into lollipop gripping position. The lollipop thus held in the cups 120 is quickly lifted from its mold and carried upwardly and rearwardly until the rollers 134 impinge against a second set of wedge-shaped cams 156.

As the lollipop gripping members move upwardly and rearwardly with the rollers 134 in contact with the wedge-shaped cams 156, the rollers and the cups 120 are urged outwardly, thus freeing the lollipop and permitting it to drop. The lollipop gripping members continue upwardly and around the rearward sprockets 100 with the cups 120 still maintained in a separated condition. Just after having reached the downwardly and forwardly extending portion of their path of movement, the rollers 134 run off the ends of the cams 156 and permit the springs 130 to snap the cups 120 inwardly into a position where they almost touch. They are prevented from being jammed together by the rollers 134 coming into contact with a centrally extending rib 158 which is of such a width that with the rollers pressing against this rib from opposite sides, the cups 120 will almost, but not quite, touch. After having moved an additional distance, the rollers 134 again come into contact with the wedge-shaped cams 154.

The reason the cups and associated mechanism are permitted to snap inwardly off the cam 156 into a position where the cups 120 almost touch each other is that this quick movement of the cups to a maximum inward position acts to free the rod 118, the slot 128, and other portions of the reciprocating mechanism from sticky sugar deposit that is always present around machines of this type. That is, sugar dust in the air collects upon the parts of the machine and if the cups never approached each other more than just a sufficient amount to grip the lollipop heads 24, the reciprocating member 121 would be likely eventually to build up a ring of sugar deposit upon the rod 118 at the point of maximum inward movement of the member 121. Subsequently, additional sugar being added to this ring of deposit might prevent the cups 120 from approaching each other sufficiently to grasp the lollipop. Therefore, once in each cycle of the lollipop gripping members, the elements 121 and the parts associated therewith are permitted to snap inwardly to a position well beyond that ever required for lollipop gripping purposes so as to clear the rod 118 and other moving parts of this troublesome sticky deposit.

The cam mechanism above described consists of the centrally extending rib 158 which is provided with slots 160 and 162 at its upper and lower ends, respectively. The lower slot 162 extends around but does not quite touch the quill shaft 104, while the upper slot 160 embraces the inner ends of the external sleeves 163 of a pair of needle bearings 165 through which the shaft 76 passes. The upper end of the rib 158 is thereby prevented from moving upwardly or downwardly by the shaft 76. At a midpoint in its length a rod 164 extends transversely of the machine through a longitudinally extending slot 166 in the central rib 158, and is secured at its ends to the horizontally rearwardly extending bars 44. A pair of tubular spacing members 168 extend between the bars 44 and the cam plates 156 and urge these cam plates against the central rib 158, so that the central rib is firmly clamped in its proper location, while the slot 166 permits slight longitudinal movement of the central rib 158 to enable adjustment and assembly of the cam mechanism.

The wedge-shaped cams 154 are stiffened by outwardly extending webs 173 and are clamped at their rearward ends against the central rib 158 by a stud 172 extending transversely through the web 173 of the cam plates 154. Nuts 174 threaded to the outward ends of the stud 172 are tightened to urge the rearward ends of the wedge-shaped cam against the central rib 158. At its midpoint, the stud 172 is secured to the central rib 158 by a pin 175 which prevents longitudinal movement of the stud and thus permits either of the cams 154 to be adjusted independently of the other.

In a position forwardly of the clamping member just described, a second clamping member 176 is provided. This latter clamping member, however, urges the forward portions of the cams 154 apart rather than together. It is comprised of a pin 178 that extends transversely of the webs 173 and pilots sleeves 180 having outwardly radiating annular flanges 182 at their inward ends. These sleeves 180 pass through openings in the webs 173, while the flanges 182 engage against recessed faces 184 in the cam webs 173 and pull the cams outwardly as the sleeves 180 are moved outwardly. The pin 178 permits free outward and inward movement of the sleeves 180, but prevents relative movement between these sleeves in any other direction. The outward ends of the sleeves 180 are threaded and are provided with nuts 186 which clamp the sleeves to the side plates 30. By loosening these nuts and adjusting their positions upon the sleeves 180, the amount the forward ends of the cams 154 are spaced apart can be determined.

The rearward cams 156 are secured against the outer faces of the central rib 158, as has been mentioned, by the rod 164 which passes through slots 187 in the webs 189 of these cams and by the tubular spacers 168 which press with their inner ends against these cam webs. Additionally, the rearward ends of these cams are bifurcated and embrace the needle bearing sleeves 163 and are thus partially supported by the shaft 76. Since the amount the rearward ends of the cams 156 are spaced apart is not critical, no adjustment in this direction is necessary.

Should it happen that any of the lollipops lack handles and are not released by the cups 120 when these cups are moved apart by the cams 156, these lollipop heads are pushed from the cups by the previously mentioned knockout member 62 which projects downwardly from the rod 58 into a position between the spaced-apart cups 120. Thus, the lollipop heads will not be carried downwardly and forwardly into a position where they can jam against lollipops being brought toward the transferring device by the lollipop manufacturing machine.

As the lollipops are carried upwardly and rearwardly from the lollipop molds, their handles 188 slide through a zigzag slot formed between two cam plates 190 and 192. These plates are attached to the side members 51 and project inwardly beneath the lollipop heads but above the lower ends of the handles. These plates are so shaped that as the lollipops move rearwardly, the handles are first pushed to one side by the cam plate 192 so that the handles extend downwardly in a posittion outwardly beyond the heads of the pins 22. Upon additional rearward movement of the lollipops the handles impinge against the edge of the plate 190 and are moved in the opposite direction so that the handle loops are slipped over the ends of the pins 26. Shortly after the handle loops have thus been slipped over the pins 22, the heads of the lollipops are released by the cups 120, and the lollipops are permitted to drop. From this point onwardly, the lollipops are carried by their handles and hang from the pins 26 on the conveyor. Their heads, therefore, are not subject to deforming stresses while they are being cooled and readied for packaging.

Sometimes it may happen that when the lollipop heads are released from the cups 120, they will drop a short distance and rest against the next succeeding pin 26 as shown in Fig. 3a. Shortly thereafter, however, the conveyor chain 28 passes over a sprocket 193 which changes its direction of movement and causes the lollipop heads to slide off the pins and fall between them. Thus, after passing this sprocket 193, all of the lollipops will hang with their heads free of contact with any of the machine elements.

The lollipop gripping members 114 are prevented from moving outwardly away from their proper path of movement by tracks 194 secured to the machine frame and along which the rollers of the chains 112 roll. Outer faces 196 of the webs 173 of the cams 154 and the similar faces 198 of the webs 189 of the cams 156 prevent inward movement of the rollers and, therefore, prevent inward movement of the gripping members 114.

From the above description of a preferred embodiment of my invention it will be apparent that I have provided a device which removes lollipops or other articles in a semi-plastic state from their molds and transfers these articles to a conveyor. In the present device, for instance, the lollipop gripping members 114 are continuously conveyed from a position immediately over the lollipop molds to a position rearwardly of and above the molds. While in a position directly above one of the lollipop molds, the lollipop gripping members are moved toward each other to grasp a lollipop so that it may subsequently be lifted from the mold and carried rearwardly and upwardly where the handle of the lollipop is hooked over one of the pins 26 of a conveyor chain 28. After the lollipop handle has been hooked over one of these pins, the head of the lollipop is released from the gripping members and the lollipop is permitted to drop and hang by its handle.

One of the important features of this device is that the lollipop, after having been grasped by a gripping member, is carried by the gripping member at such a speed that the trailing edge of the lollipop mold 20 from which the lollipop is removed will not dig into the forward side of the lollipop as the lollipop is lifted from the mold. Therefore, for best results, the horizontal rearward component of the velocity of the upwardly and rearwardly moving lollipop gripping members should be slightly greater than the velocity of horizontal movement of the mold elements 20. This is because as the mold elements 20 pass around their rearward sprockets 18, the upper edges of the lollipop molds will be traveling slightly faster than they do when moving horizontally, since the upper edges of the lollipop molds are farther from the center of the sprockets 18 than is their conveyor chain 16. Additionally, as an inspection of the drawings will show, the pitch of the chains 16 which carry the lollipop molds is considerably less than the pitch of the conveyor chain 28. This difference in pitch is provided because it is desired that the lollipops hanging from the conveyor pins 26 be spaced considerably farther apart than are the lollipops when resting in the mold elements 20.

It will be apparent, therefore, that the gripping members should travel slightly faster than the mold chains 16 at the point where the lollipops are lifted from the mold elements, and that the gripping members should travel still faster in the region where the lollipop handles are hooked over the pins 26. This is accomplished by spacing the gripping members inwardly closer to the center of the shaft 108 than the pitch line of the sprockets 102. Thus, as the gripping members pass around the shaft 108 they are closer to the center of rotation than chains 112 and, therefore, travel slower than these chains. After completing their arcuate movement around the shaft 108, the gripping members speed up and travel at the same linear velocity as the chains 112 and, therefore, at the same velocity as the conveyor chain 28.

Although the embodiment of my invention shown and described includes mechanism for hooking the lollipop handles over pins on a conveyor, it will be appreciated that the device is useful even though it is desired merely to remove lollipops from their molds and drop these lollipops into a receptacle or on to a belt conveyor. This is so since the use of the present device insures the positive removal of the lollipops from their molds and thus insures against the possibility of the lollipops sticking to their molds and being returned to the mold filling portion of the lollipop making machine.

Having described my invention and one embodiment thereof, what I claim as new and useful and desire to secure by Letters Patent of the United States is:

1. A device for transferring lollipops or similar objects having looped handles from their molds to a conveyor having hangers while both the molds and the conveyor are in motion, comprising: A plurality of transferring members; means to move said members at a substantially uniform speed in a circuit between a point adjacent said molds and a point adjacent said conveyor, said members including elements for gripping lollipop heads to remove the lollipops from their molds; and means to hook the loops formed by the lollipop handles over the hangers on said conveyor.

2. A device for transferring lollipops or similar objects having looped handles from their molds to a conveyor having hangers while both the molds and the conveyor are in motion, comprising: A plurality of transferring members; means to move said members at a substantially uniform speed in a circuit between a point adjacent said molds and a point adjacent said conveyor, said members including elements for gripping lollipop heads to remove the lollipops from their molds; and means to deflect the loops formed by the lollipop handles away from said hangers and means acting subsequently to deflect said loops toward said hangers.

3. A device for transferring lollipops or similar objects having looped handles from their molds to a conveyor having hangers while both the molds and the conveyor are in motion, comprising: A plurality of transferring members; means to move said members at a substantially uniform speed in a circuit between a point adjacent said molds and a point adjacent said conveyor, said members including mutually approachable elements for gripping lollipop heads to remove the lollipops from their molds; means to cause mutual approachment of said elements when said elements are adjacent said molds; means acting subsequently to separate said mutually approachable elements; and means to hook the loops formed by the lollipop handles over the hangers on said conveyor before the separation of said elements is complete.

4. A device for transferring lollipops or similar objects having looped handles from their molds to a conveyor having hangers while both the molds and the conveyor are in motion, comprising: A plurality of transferring members; means to move said members at a substantially uniform speed in a circuit between a point adjacent said molds and a point adjacent said conveyor, said members including mutually approachable elements for gripping lollipop heads to remove the lollipops from their molds; means to cause mutual approachment of said elements when said elements are adjacent said molds; means acting subsequently to separate said mutually approachable elements; means to deflect the loops formed by the lollipop handles away from said hangers; and means acting subsequently to deflect said loops toward said hangers before the separation of said elements is complete.

5. A device for transferring molded objects having projections extending therefrom from their molds to a conveyor having hangers while both the molds and the conveyor are in motion, comprising: A plurality of transferring members; means to move said members at a substantially uniform speed in a circuit between a point adjacent said molds and a point adjacent said conveyor, said members including elements for gripping the molded objects to remove them from their molds; means to attach the projections to the hangers on said conveyor; and means active thereafter to cause said gripping elements to release said molded objects.

6. A device for transferring objects of the type which tend to build up an adherent layer upon the transfer mechanism comprising: Conveyor means movable in a circuit between a position where said objects are to be picked up and a point spaced therefrom, members secured to and movable with said conveyor means, elements on said members adapted when moved relative to each other in one direction to grasp said objects, means to cause said relative motion in said one direction when said elements are near the said position, means to cause opposite relative movement while the elements are passing in the circuit between said position and said point to release said objects, and means to remove adherent substances from the transfer mechanism comprising, means to cause comparatively rapid relative motion of said elements in both directions while said elements are moving from said point to said position.

7. A device for transferring objects of the type which tend to build up an adherent layer upon the transfer mechanism which interferes with the operation of the latter comprising: Conveyor means movable in a circuit between a position where said objects are to be picked up and a point spaced therefrom, members secured to and movable with said conveyor means, elements on said members adapted when moved relative to each other in one direction to grasp said objects, means to cause said relative motion in said one direction when said elements are near the said position, means to cause opposite relative movement while the elements are passing in the circuit between said position and said point to release said objects; and means to remove said adherent substance including means to cause relative motion of said elements in both directions while said elements are returning from said point to said position to free said elements of foreign material adhering thereto, and the last said means being adapted to cause relative motion of said elements in at least one of said directions to a greater extent than the relative motion of said elements in the same direction during the travel of said elements between said position and said point.

8. A device for transferring objects that tend to build up an adherent layer of substance upon the transfer mechanism which interferes with the operation of the latter comprising: Conveyor means movable in a circuit between a position where said objects are to be picked up and a point spaced therefrom, members secured to and movable with said conveyor means, elements on said members adapted when moved relative to each other in one direction to grasp said objects, resilient means tending to move said elements in said one direction, cam means adapted to force said elements in the opposite direction during a portion of the travel of the members around said circuit, means including said cam to cause said elements to be resiliently urged in one direction at another position in said circuit to cause said elements to grasp said objects, and means, including said cam, to remove substances adhering to said transfer mechanism by causing rapid movement of said elements relative to each other in the grasping direction but to a greater extent than said elements move when grasping one of said objects.

CARL W. SPOHR.